(12) United States Patent
Yamada

(10) Patent No.: US 9,141,304 B2
(45) Date of Patent: Sep. 22, 2015

(54) STORAGE DEVICE AND METHOD FOR CONTROLLING STORAGE DEVICE

(71) Applicant: FUJITSU LIMITED, Kawasaki-shi, Kanagawa (JP)

(72) Inventor: Hidenori Yamada, Kita (JP)

(73) Assignee: FUJITSU LIMITED, Kawasaki (JP)

( * ) Notice: Subject to any disclaimer, the term of this patent is extended or adjusted under 35 U.S.C. 154(b) by 292 days.

(21) Appl. No.: 13/783,880

(22) Filed: Mar. 4, 2013

(65) Prior Publication Data
US 2013/0318316 A1    Nov. 28, 2013

(30) Foreign Application Priority Data

May 24, 2012 (JP) ................. 2012-118956

(51) Int. Cl.
*G06F 12/02* (2006.01)
*G06F 3/06* (2006.01)

(52) U.S. Cl.
CPC .............. *G06F 3/0652* (2013.01); *G06F 3/061* (2013.01); *G06F 3/065* (2013.01); *G06F 3/0608* (2013.01); *G06F 3/0644* (2013.01); *G06F 3/0689* (2013.01); *G06F 12/023* (2013.01)

(58) Field of Classification Search
CPC . G06F 12/023; G06F 12/0292; G06F 3/0608; G06F 3/0644; G06F 3/065
See application file for complete search history.

(56) References Cited

U.S. PATENT DOCUMENTS

| | | | | |
|---|---|---|---|---|
| 8,086,652 | B1* | 12/2011 | Bisson et al. ................ | 707/823 |
| 2009/0254695 | A1 | 10/2009 | Deguchi et al. | |
| 2010/0332780 | A1* | 12/2010 | Furuya .......................... | 711/162 |
| 2011/0066803 | A1* | 3/2011 | Arakawa et al. .............. | 711/114 |
| 2011/0197023 | A1* | 8/2011 | Iwamitsu et al. ............. | 711/114 |
| 2012/0226886 | A1* | 9/2012 | Hatfield et al. ............... | 711/170 |
| 2012/0331223 | A1* | 12/2012 | Bello et al. .................... | 711/114 |

FOREIGN PATENT DOCUMENTS

| | | |
|---|---|---|
| JP | 2009-251970 | 10/2009 |
| JP | 2011-13821 | 1/2011 |

* cited by examiner

*Primary Examiner* — Hal Schnee
(74) *Attorney, Agent, or Firm* — Staas & Halsey LLP

(57) ABSTRACT

A storage device includes a memory and a control device. The control device allocates a first storage region out of a plurality of storage regions to a first logical address specified by an external device. The control device stores, in the memory, first information associating the first logical address with a first physical address indicating the first storage region. The control device deletes, upon accepting a request for release of a second storage region indicated by a second physical address associated with a second logical address specified by the external device, second information associating the second logical address with the second physical address from the memory. The control device releases, when copy process of copying first data stored in the second storage region is unexecuted, the second storage region after finishing the copy process.

4 Claims, 14 Drawing Sheets

| LOGICAL LBA | PHYSICAL LBA |
|---|---|
| 1000 | 35000(TPPS_10) |
| 2000 | 47000(TPPS_22) |
| 3000 | 37000(TPPS_12) |

23b(33b)

| COPY SOURCE TPPS | COPY DESTINATION OLU | COPY DESTINATION LOGICAL LBA | STATE |
|---|---|---|---|
| TPPS_11 | 1 | 5000 | FINISHED |
| TPPS_11 | 2 | 6000 | FINISHED |
| TPPS_20 | 3 | 7000 | IN EXECUTION |

FIG. 9

| COPY GENERATION | COPY SOURCE TPPS | COPY DESTINATION OLU | COPY DESTINATION LOGICAL LBA |
|---|---|---|---|
| 1 | TPPS_11 | 1 | 5000 |
| 2 | TPPS_11 | 2 | 6000 |
| 3 | TPPS_20 | 3 | 7000 |

23c(33c)

STORAGE DEVICE AND METHOD FOR CONTROLLING STORAGE DEVICE

CROSS-REFERENCE TO RELATED APPLICATION

This application is based upon and claims the benefit of priority of the prior Japanese Patent Application No. 2012-118956, filed on May 24, 2012, the entire contents of which are incorporated herein by reference.

FIELD

The embodiments discussed herein are related to a storage device and a method for controlling a storage device.

BACKGROUND

In the past, in a case of receiving a request for allocation of, for example, 10 TB of storage area from a server, a storage device allocates a physical disk capacity of 10 TB. In contrast, there is a case that the server actually uses only 20% through 30% of the allocated amount out of the physical disk capacity allocated as requested. In such a manner, there is a case that a physical disk capacity allocated to a server is not utilized efficiently.

Given such a situation, as an arrangement for efficiently using a physical disk capacity of a storage device, there is a technique called thin provisioning. In thin provisioning, in a case of receiving a request for allocation of 10 TB from a server, for example, a storage device allocates a virtual volume of 10 TB to the server as requested, while actually allocating a physical disk capacity of only 2 TB.

Then, in a case that the server uses a physical disk capacity exceeding a predetermined threshold, the storage device allocates a fresh additional physical disk capacity to the server. In such a manner, thin provisioning allocates a physical disk capacity at the time of a host access request as the occasion arises. This enables the storage device to efficiently utilize the physical disk capacity. The virtual volume used at this time is called as a thin provisioning volume (TPV), and a smallest unit of the physical disk capacity allocated to the TPV is called as a thin provisioning pool slice (TPPS).

In a case that data is deleted by the server, the deleted data is handled as unused in the operating system (OS) of the server. In contrast, since the TPPS is still allocated to the deleted data in the storage device, the storage device turns out to consume the physical disk capacity uselessly.

As an arrangement to improve this, there is an UNMAP command. An UNMAP command is a command to request the TPV in the storage device for release of the TPPS by specifying a logical address of the unused TPPS. The server issues this UNMAP command to the storage device in coordination with the deletion of data, thereby efficiently operating the TPPS allocated by thin provisioning. The UNMAP command is one of vStorage APIs (application programming interfaces) for array integration (VAAI) out of storage APIs provided by VMware.

The storage device sometimes has a copy function of a snapshot type that logically copies TPPS data. The UNMAP command is allowed to be used together with the copy function executed by the storage device. For example, in a case that an UNMAP command is issued to uncopied TPPS data, the storage device copies the TPPS data and releases the TPPS after finishing the copy. Then, after releasing the TPPS, the storage device responds to the server for the UNMAP command.

The UNMAP command has a capacity, subjected to be processed in a single request from a host, from several GB to several tens of GB or even more, and in comparison with regular write I/O (input/output), the capacity subjected to be processed is large. Therefore, in a case that the storage device receives an UNMAP command and copies all the range requested by the UNMAP command, the time until the UNMAP command is executed increases. As a result, since the server is not able to receive a response to the UNMAP command until finishing TPPS release process by the storage device, there is a higher possibility that the UNMAP command is timed out.

Given such a situation, the storage device records that release process is in a state of being reserved for the TPPS requested for release and immediately returns a response to the UNMAP command to the server. Then, the storage device executes the release process asynchronously at the time of completion of saving the TPPS data to a copy destination to release the TPPS. In such a manner, the storage device keeps an UNMAP command issued to a region subjected to copy from being timed out.

Japanese Laid-open Patent Publication No. 2009-251970 and Japanese Laid-open Patent Publication No. 2011-13821 disclose related techniques.

However, the techniques in the past described above have a problem of delaying data writing that specifies a logical address specified in the request for release.

In a case that a request for writing data is issued to the TPPS of release process in a reserved state, the storage device puts the request for writing data on standby until the TPPS data is copied and the TPPS is released after finishing the copy. Therefore, the server is not able to receive a response to the request for writing data until finishing the TPPS release process by the storage device, and there is a higher possibility that the request for writing data is timed out.

In addition, the storage device sometimes executes copy of a snapshot type to identical TPPS data at different time. Then, in a case that, after an UNMAP command is issued to the TPPS of a copy source, a request for writing data is issued to the TPPS of release process in a reserved state, the request for writing data is put on standby until finishing the TPPS release process by the storage device. As a result, the possibility that the request for writing data is timed out becomes even higher.

Still in addition, the storage device sometimes executes an UNMAP command and copy of a snapshot type alternately. In such a case, a response performance of the data writing process to the TPPS of release process in a reserved state decreases chronically.

SUMMARY

According to an aspect of the present invention, provided is a storage device including a memory and a control device. The control device allocates a first storage region out of a plurality of storage regions to a first logical address specified by an external device. The control device stores, in the memory, first information associating the first logical address with a first physical address indicating the first storage region. The control device deletes, upon accepting a request for release of a second storage region indicated by a second physical address associated with a second logical address specified by the external device, second information associating the second logical address with the second physical address from the memory. The control device releases, when copy process of copying first data stored in the second storage region is unexecuted, the second storage region after finishing the copy process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a chart illustrating one example of a data structure of data stored in a copy generation management table;

DESCRIPTION OF EMBODIMENTS

Detailed descriptions are given below to embodiments of a storage device and a method for controlling a storage device disclosed herein with reference to the drawings. Embodiments are not limited to these embodiments. It is possible to appropriately combine each embodiment as long as the process contents do not contradict with each other.

First Embodiment

In a first embodiment, with reference to FIGS. 1 through 7, descriptions are given to a configuration of an information processing system, a configuration of a storage device, a configuration of a control module (CM), process behaviors by the storage device, a process procedure by the storage device, effects, and the like.

Configuration of Information Processing System According to First Embodiment

Figure 1:
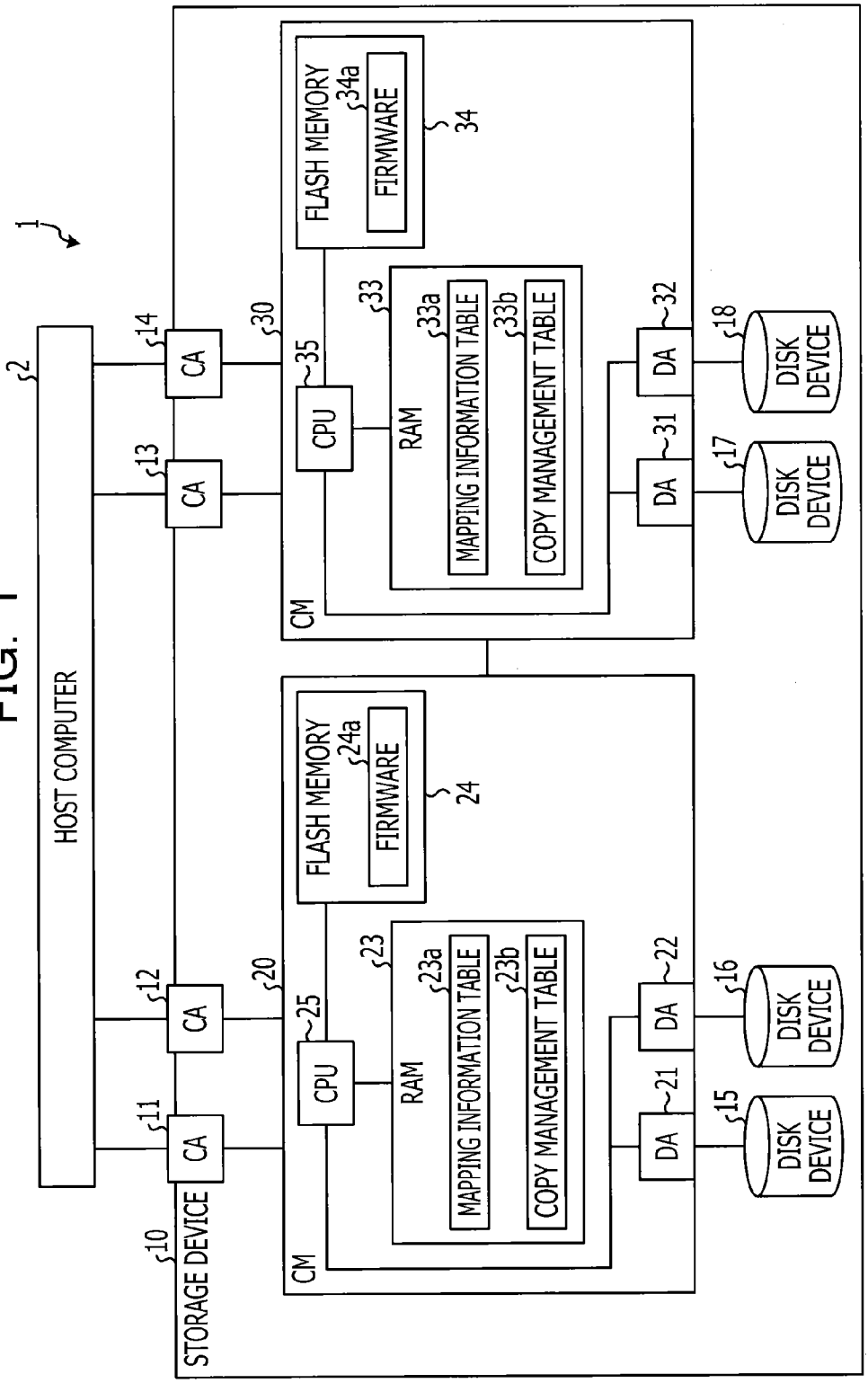
FIG. 1 is a block diagram illustrating a configuration of an information processing system according to a first embodiment.

FIG. 1 is a block diagram illustrating a configuration of an information processing system 1 according to the first embodiment. As illustrated in FIG. 1, the information processing system 1 includes a host computer 2 and a storage device 10. In the information processing system 1, the host computer 2 is communicably connected with the storage device 10 via a fibre channel (FC), an internet small computer system interface (iSCSI), and the like. The number of host computers and the number of storage devices included in the information processing system 1 is not limited to illustrated numbers but modifiable.

The host computer 2 is, for example, a server and executes reading and writing of data of a logical volume to the storage device 10.

The storage device 10 allocates a physical disk capacity by thin provisioning as the occasion arises in a case that an access is requested by the host computer 2. For example, in a case of receiving a request for allocation of 10 TB from the host computer 2, the storage device 10 allocates a virtual volume of 10 TB to the host computer 2 as requested, while actually allocating a physical disk capacity of only 2 TB. Then, in a case that the host computer 2 uses a physical disk capacity exceeding a predetermined threshold, the storage device 10 allocates a fresh additional physical disk capacity to the host computer 2. The virtual volume used at this time is called as a thin provisioning volume (TPV), and a smallest unit of the physical disk capacity allocated to the TPV is called as a thin provisioning pool slice (TPPS). The disk capacity that the host computer 2 requests the storage device 10 to allocate and the capacity of the virtual volume and the physical disk capacity that is allocated to the host computer 2 by the storage device 10 are not limited as the above descriptions.

Configuration of Storage Device 10 According to First Embodiment

With reference to FIG. 1 consecutively, a configuration of the storage device 10 according to the first embodiment is described. The storage device 10 includes a channel adapter (CA) 11, a CA 12, a CA 13, a CA 14, a disk device 15, a disk device 16, a disk device 17, a disk device 18, a control module (CM) 20 and a CM 30. The CAs 11, 12, 13, and 14 are interfaces to the host computer 2. The host computer 2 and the CAs 11, 12, 13, and 14 are communicably connected with each other via an FC, an iSCSI, or the like.

The disk devices 15, 16, 17, and 18 constitute redundant arrays of inexpensive disks (RAID) and store writing data received from the host computer 2. The disk devices 15, 16, 17, and 18 constitute TPVs, which are virtual volumes.

The CM 20 controls input/output of data between the host computer 2 and the disk devices 15 and 16. The CM 30 controls input/output of data between the host computer 2 and the disk devices 17 and 18. The number of CMs included in the storage device 10 is not limited to the illustrated number.

Configuration of CM 20 According to First Embodiment

With reference to FIG. 1 consecutively, a configuration of the CM 20 according to the first embodiment is described. As illustrated in FIG. 1, the CM 20 includes a device adapter (DA) 21, a DA 22, a random access memory (RAM) 23, a flash memory 24, and a central processing unit (CPU) 25.

The DA 21 is an interface to the disk device 15, and the DA 22 is an interface to the disk device 16.

The RAM 23 stores a mapping information table 23a and a copy management table 23b. The RAM 23 also stores pool management information, not illustrated, for managing a pool of unused TPPSs. The RAM 23 is substitutable with a dual inline memory module (DIMM), a dynamic random access memory (DRAM), or the like.

The mapping information table 23a stores mapping information that associates a logical address of a TPV achieved by the disk device with a physical address indicating a TPPS allocated in the TPV. The data structure of data stored in the mapping information table 23a is described later with reference to FIG. 2.

The copy management table 23b stores information for managing whether or not data of a logical volume stored in the TPPS has been copied. The data structure of data stored in the copy management table 23b is described later with reference to FIG. 3.

The flash memory 24 stores firmware 24a. The functional configuration of functions described in the firmware 24a is described later with reference to FIG. 4. The CPU 25 loads and executes the firmware 24a stored in the flash memory 24, thereby performing various types of arithmetic process.

Configuration of CM 30 According to First Embodiment

As illustrated in FIG. 1, the CM 30 includes a DA 31, a DA 32, a RAM 33, a flash memory 34, and a CPU 35. The DA 31 is an interface to the disk device 17, and the DA 32 is an interface to the disk device 18.

The RAM 33 stores a mapping information table 33a and a copy management table 33b. The mapping information table 33a stores information similar to the mapping information table 23a. The copy management table 33b stores information similar to the copy management table 23b. The RAM 33 also stores pool management information, not illustrated, for managing a pool of unused TPPSs. The RAM 33 is substitutable with a DIMM, a DRAM, or the like.

The flash memory 34 stores firmware 34a. The functional configuration of functions described in the firmware 34a is described later with reference to FIG. 4. The CPU 35 loads and executes the firmware 34a stored in the flash memory 34, thereby performing various types of arithmetic process.

The storage device 10 configured in such a manner executes the following process in a case that the CPU 25 has loaded the firmware 24a or in a case that the CPU 35 has loaded the firmware 34a. That is, the storage device 10 maintains, in the RAM, mapping information that associates a logical address of a TPV achieved by the disk device with a physical address indicating a TPPS allocated in the TPV. The storage device 10 executes the following process to the TPPS storing data of a logical volume subjected to copy in a case of being requested for release with a specified logical address that is associated with a physical address indicating the TPPS. That is, the storage device 10 deletes the TPPS from the mapping information and saves the TPPS from an access related to the TPV by the host computer 2. Then, the storage device 10 updates the field of a physical address of the mapping information corresponding to the logical address to information indicating that a physical address is unallocated, allowing allocation of a physical address indicating a fresh TPPS to the logical address. Subsequently, the storage device 10 executes copy of data of the logical volume stored in the saved TPPS. After finishing the copy, the storage device 10 releases the TPPS storing the data of the logical volume subjected to the copy. That is to say, the physical address indicating this TPPS is registered in the pool management information for managing the pool of unused regions, thereby managing the physical address as an unused region after that. The mapping information table 23a (33a), the copy management table 23b (33b), and the pool management information that are stored in the storage device 10 are collectively referred to as "management information".

Data Structure of Data Stored in Mapping Information Table 23a (33a)

Figure 2:
FIG. 2 is a chart illustrating one example of a data structure of data stored in a mapping information table.

Next, with reference to FIG. 2, one example of data structure of data stored in the mapping information tables 23a and 33a is described. Since the data structure of data stored in the mapping information tables 23a and 33a are similar, the data structure of data stored in the mapping information table 23a is described here. In the following description, data stored in the mapping information tables 23a and 33a is appropriately mentioned as "mapping information".

FIG. 2 is a chart illustrating one example of a data structure of data stored in the mapping information table 23a. As illustrated in FIG. 2, the mapping information table 23a stores information that associates a "logical LBA (logical block address)" with a "physical LBA". One LBA is 512 bytes.

A "logical LBA" stored in the mapping information table 23a represents a logical address in a TPV, which is a virtual region achieved by the disk devices 15, 16, 17, and 18. For example, a "logical LBA" has a value such as "1000" and "2000". The host computer 2 accesses the data of the logical volume stored in the TPPS by specifying the logical LBA. The host computer 2 also requests for release of the TPPS by specifying the logical LBA.

A "physical LBA" stored in the mapping information table 23a represents a physical address in a TPV, which is a virtual region achieved by the disk devices. For example, a "physical LBA" has a value such as "35000" and "47000".

The "physical LBA" is uniquely associated with an identifier of a TPPS. In other words, a "physical LBA" indicates a TPPS allocated in the TPV. For example, "35000" as a "physical LBA" is associated with a TPPS "TPPS_10", and "47000" as a "physical LBA" is associated with a TPPS "TPPS_22". In a case of accepting input/output process from the host computer 2 with a specified logical LBA, the storage device 10 executes the input/output process to the TPPS indicated by a physical LBA associated with the specified logical LBA.

In the example illustrated in FIG. 2, the logical LBA "1000" in the TPV corresponds to the physical LBA "35000" and indicates the physical region identified by "TPPS_10". Similarly, the logical LBA "2000" in the TPV corresponds to the physical LBA "47000" and indicates the physical region identified by "TPPS_22".

The "physical LBA" stored in the mapping information table 23a is updated by a TPPS mapping management section 105 and a TPPS allocation management section 106 described later.

Data Structure of Data Stored in Copy Management Table 23b (33b)

Figure 3:
FIG. 3 is a chart illustrating one example of a data structure of data stored in a copy management table.

Next, with reference to FIG. 3, one example of data structure of data stored in the copy management tables 23b and 33b is described. Since the data structure of data stored in the copy management tables 23b and 33b are similar, the data structure of data stored in the copy management table 23b is described here.

FIG. 3 is a chart illustrating one example of a data structure of data stored in the copy management table 23b. As illustrated in FIG. 3, the copy management table 23b stores information that associates a "copy source TPPS", a "copy destination open logical unit (OLU)", a "copy destination logical LBA", and a "state" with each other.

Here, the "copy source TPPS" stored in the copy management table 23b represents an identifier of a TPPS of a copy source. For example, a "copy source TPPS" has a value such as "TPPS_11" and "TPPS_20".

The "copy destination OLU" stored in the copy management table 23b represents an identifier of an OLU of a copy destination. For example, a "copy destination OLU" has a value such as "1" and "2". The OLU is not a TPV managed by thin provisioning but a logical unit generally used in open systems.

The "copy destination logical LBA" stored in the copy management table 23b represents a logical address in the OLU of the copy destination. For example, a "copy destination logical LBA" has a value such as "5000" and "6000".

The "state" stored in the copy management table 23b represents a state of a copy process. For example, a "state" has a value such as "unexecuted" representing that the copy process is unexecuted, "in execution" representing that the copy process is in execution, or "finished" representing that the copy process is finished.

In the example illustrated in FIG. 3, the copy management table 23b represents that process of copying the data of the logical volume stored in "TPPS_11" to the logical LBA "5000" of the OLU "1" is "finished". Similarly, the copy management table 23b represents that process of copying the data of the logical volume stored in "TPPS_11" to the logical LBA "6000" of the OLU "2" is "finished".

The "state" stored in the copy management table 23b is updated by a copy process control section 104 described later.

Functional Configuration of Functions Described in Firmware 24a (34a)

Figure 4:
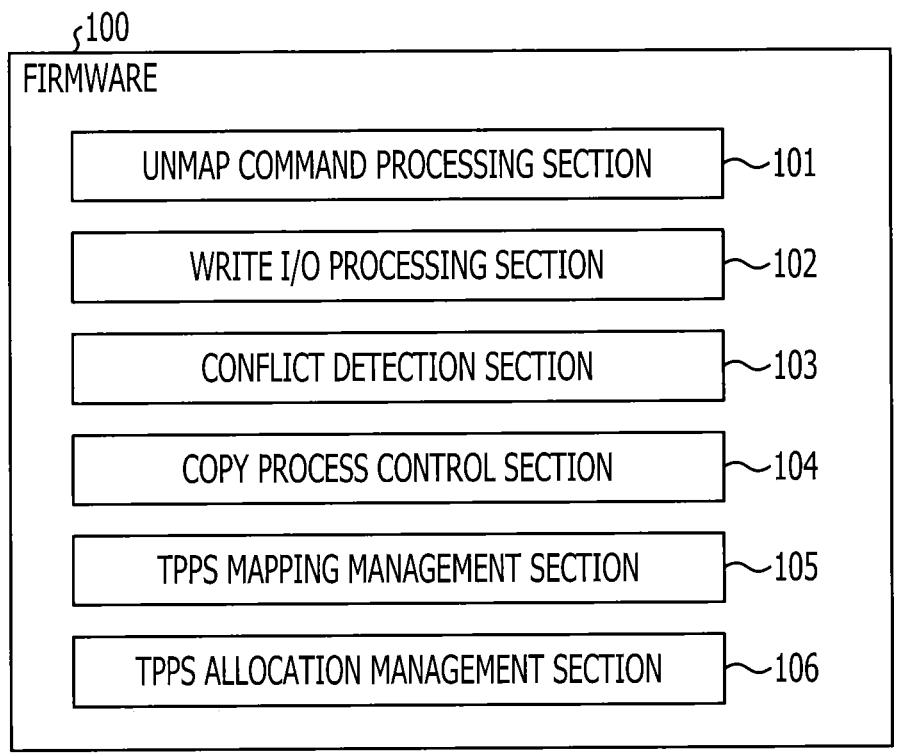
FIG. 4 is a diagram illustrating a functional configuration of a storage device according to a first embodiment.

Next, with reference to FIG. 4, functional configurations of the functions described in the firmware 24a and 34a executed by the storage device 10 according to the first embodiment are described. Since the functional configurations of the functions described in the firmware 24a and 34a executed by the storage device 10 according to the first embodiment are similar, the firmware 24a and 34a are referred to as firmware 100 here for the description.

FIG. 4 is a diagram illustrating a functional configuration of functions described in firmware 100 executed by the storage device 10 according to the first embodiment. The functions described in the firmware 100 executed by the storage device 10 is achieved by the RAM 23 and the CPU 25 in cooperation or the RAM 33 and the CPU 35 in cooperation.

As illustrated in FIG. 4, the functions described in the firmware 100 include an UNMAP command processing section 101, a write I/O processing section 102, a conflict detection section 103, the copy process control section 104, the TPPS mapping management section 105, and the TPPS allocation management section 106.

The UNMAP command processing section 101 receives an UNMAP command from the host computer 2. Then, the UNMAP command processing section 101 causes the conflict detection section 103 described later to determine whether or not to copy data of the logical volume stored in the TPPS requested for release by the UNMAP command.

The UNMAP command processing section 101 suspends release of the TPPS requested for release in a case of being determined by the conflict detection section 103 to execute copy process of the data of the logical volume stored in the TPPS requested for release. Then, the UNMAP command processing section 101 causes the TPPS mapping management section 105 to update the mapping information table 23a. The UNMAP command processing section 101 releases the TPPS storing the data of the logical volume subjected to copy after finishing the copy of the data of the logical volume stored in the TPPS requested for release.

The UNMAP command processing section 101 releases the TPPS requested for release in a case of being determined by the conflict detection section 103 not to execute copy process of the data of the logical volume stored in the TPPS requested for release. Then, the UNMAP command processing section 101 causes the TPPS mapping management section 105 to update the mapping information table 23a.

The UNMAP command processing section 101 sends a response corresponding to the UNMAP command to the host computer 2 in a case of being informed that the mapping information table 23a is updated by the TPPS mapping management section 105.

In a case of receiving a write I/O from the host computer 2 with a specified logical address, the write I/O processing section 102 writes the data of the logical volume in the TPPS indicated by the physical address allocated to the logical address.

For example, in a case of receiving a write I/O from the host computer 2 with a specified logical address, the write I/O processing section 102 requests the TPPS allocation management section 106 for allocation of a TPPS to the specified logical address. Then, the write I/O processing section 102 writes the write data received from the host computer 2 in the TPPS allocated by the TPPS allocation management section 106. The write I/O processing section 102 responds to the host computer 2 for completion of the write I/O after writing the write data received from the host computer 2.

The conflict detection section 103 determines whether or not to execute copy process of the TPPS requested for release. For example, the conflict detection section 103 reads out the "state" corresponding to the TPPS requested for release in the copy management table 23b and determines whether or not the "state" is "finished". In a case that the "state" in the copy management table 23b is "finished", the conflict detection section 103 determines not to execute copy process.

In a case that the "state" in the copy management table 23b is not "finished", that is, in a case that the "state" in the copy management table 23b is "in execution" or "unexecuted", the conflict detection section 103 determines to execute copy process.

The copy process control section 104 launches copy process of the data of the logical volume stored in the TPPS in the background. For example, in a case of executing copy process of the TPPS requested for release, the copy process control section 104 executes copy of the data of the logical volume stored in the saved TPPS.

The copy process control section 104 sets "in execution" for the "state" in the copy management table 23b in a case of executing the copy process, and sets "finished" for the "state" in the copy management table 23b in a case of finishing the copy process.

The TPPS mapping management section 105 updates the mapping information table 23a stored in the RAM 23 such that the TPPS requested for release by the host computer 2 becomes in a release state. For example, in a case of not executing copy of the TPPS requested for release, the TPPS mapping management section 105 updates the mapping information after the TPPS requested for release is released by the UNMAP command processing section 101.

The TPPS mapping management section 105 also executes the following process to the TPPS storing the data of the logical volume subjected to copy in a case of being requested for release with a specified logical address that is associated with a physical address indicating the TPPS. That is, the TPPS mapping management section 105 saves the TPPS requested for release and updates the mapping information to be in a state of allowing allocation of a physical address indicating a fresh TPPS to the logical address specified in the request for release.

For example, the TPPS mapping management section 105 deletes a value stored in the "physical LBA" that is associated with the "logical LBA" indicating the TPPS requested for release. To cite one example, in a case of being requested for release with a specified logical LBA "2000", the TPPS mapping management section 105 deletes "36000" stored in the "physical LBA" corresponding to the logical LBA "2000".

In a case of accepting a request for writing data of a logical volume with the logical address specified in the request for release, the TPPS allocation management section 106 allocates a physical address indicating a fresh TPPS to the logical address. For example, the TPPS allocation management section 106 acquires a physical LBA indicating a new TPPS in association with the "logical LBA" requested for a write I/O. To cite one example, in a case of accepting a request for writing data of a logical volume with a specified logical LBA "2000", the TPPS allocation management section 106 stores "47000" in the "physical LBA" corresponding to the logical LBA "2000".

Process Behaviors by Storage Device 10 According to First Embodiment

Figure 5:
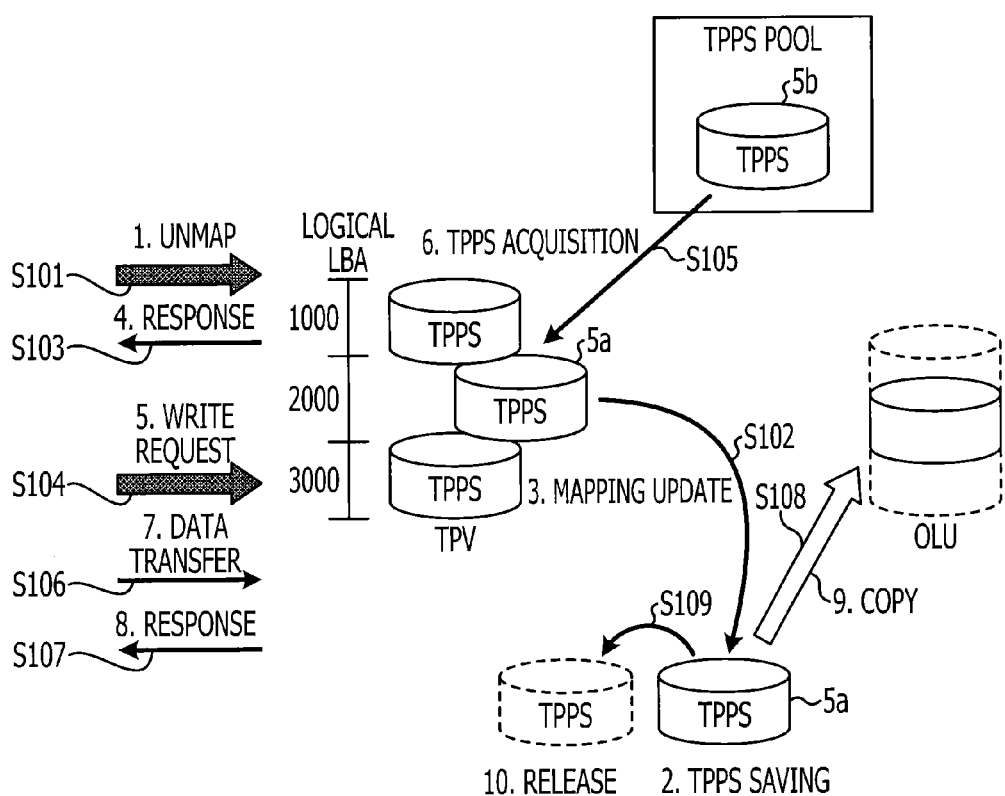
FIG. 5 is a diagram illustrating one example of process behaviors by a storage device according to a first embodiment.

Next, with reference to FIG. 5, one example of process behaviors by the storage device 10 according to the first embodiment is described. FIG. 5 is a diagram illustrating one example of process behaviors by the storage device 10 according to the first embodiment. FIG. 5 illustrates a case that release of a TPPS 5a indicated by the logical LBA "2000" is requested and copy of the data of the logical volume stored in the TPPS 5a is unexecuted.

As illustrated in FIG. 5, the storage device 10 receives an UNMAP command, from the host computer 2, that requests for release of the TPPS 5a indicated by the logical LBA "2000" (S101). Since copy of the data of the logical volume stored in the TPPS 5a requested for release is unexecuted, the storage device 10 deletes the TPPS 5a from the mapping information and to update the mapping information table 23a (33a) (S102). Accordingly, it is possible to save the TPPS 5a from the access related to the TPV by the host computer 2.

Then, the storage device 10 sends a response to the UNMAP command to the host computer 2 (S103). Subsequently, the storage device 10 receives a write request to the TPPS indicated by the logical LBA "2000" from the host computer 2 (S104).

Since the logical LBA "2000" is in a state where no TPPS is allocated in the mapping information table 23a (33a), the storage device 10 having the write request received therein acquires a new TPPS 5b for the logical LBA "2000" (S105). Then, the storage device 10 receives write data from the host computer 2 (S106), and sends a response to the write request to the host computer 2 (S107).

The storage device 10 executes copy of the data of the logical volume stored in the saved TPPS 5a (S108). Then, the storage device 10 releases the TPPS 5a after finishing the copy (S109).

Process Procedure of Process by Storage Device 10 According to First Embodiment

Figure 6:
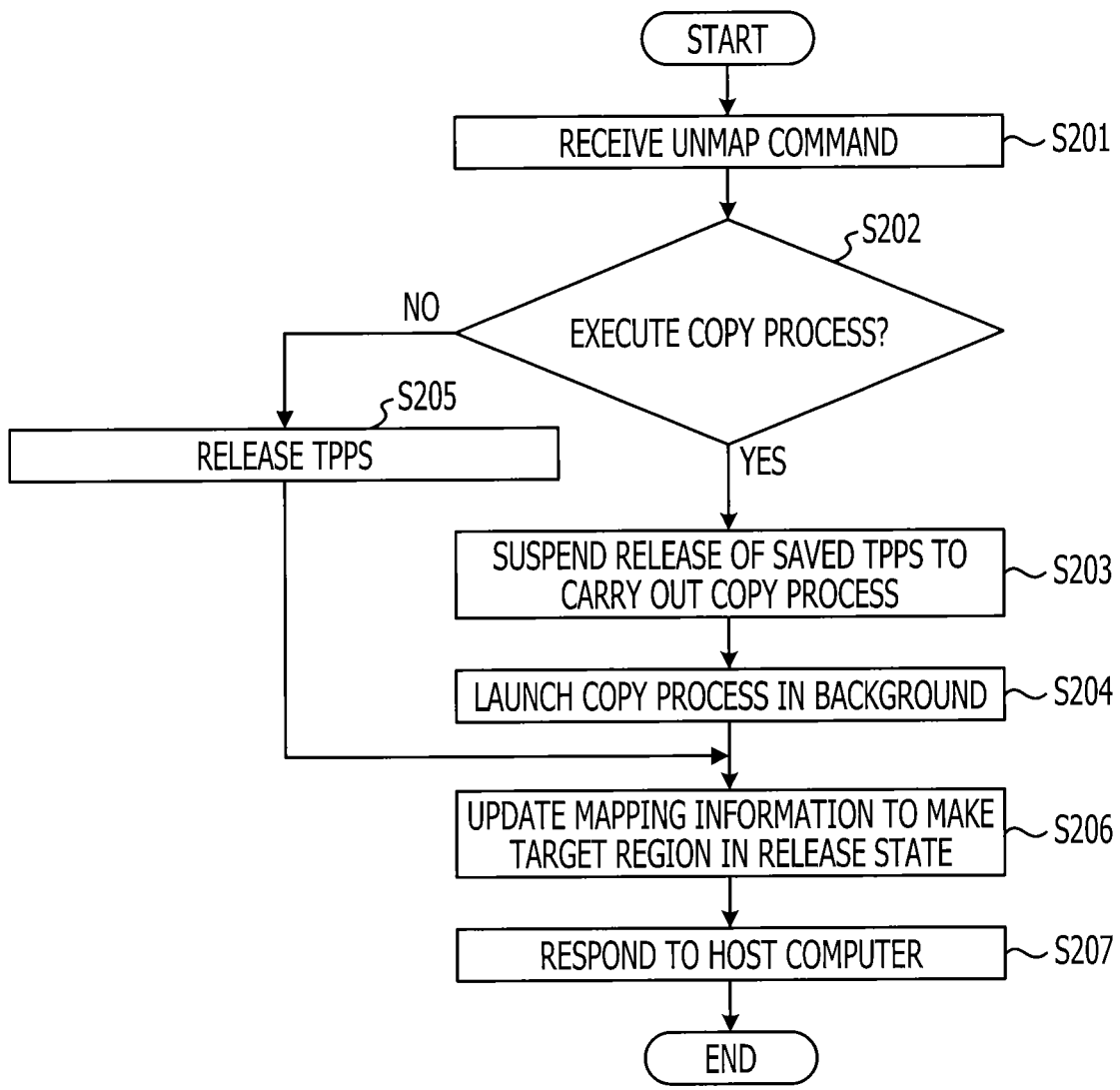
FIG. 6 is a flowchart illustrating a process procedure of mapping information update process upon receiving an UNMAP command in the storage device according to a first embodiment.
Figure 7:
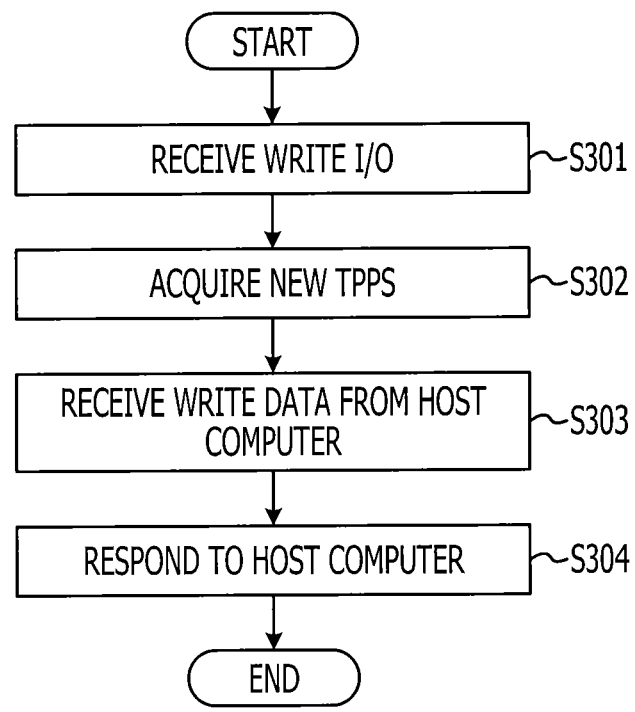
FIG. 7 is a flowchart illustrating a process procedure of TPPS acquisition process when a write I/O is received in a storage device according to a first embodiment.

Next, with reference to FIGS. 6 and 7, a process procedure of process by the storage device 10 according to the first embodiment is described. A process procedure of the mapping information update process upon receiving an UNMAP command in the storage device 10 is described with reference to FIG. 6, and a process procedure of the TPPS acquisition process upon receiving a write I/O in the storage device 10 is described with reference to FIG. 7.

Mapping Information Update Process Upon Receiving UNMAP Command

FIG. 6 is a flowchart illustrating a process procedure of mapping information update process upon receiving an UNMAP command in the storage device 10 according to the first embodiment. The mapping information update process upon receiving an UNMAP command is executed with an opportunity that the UNMAP command processing section 101 has received an UNMAP command.

As illustrated in FIG. 6, the UNMAP command processing section 101 receives an UNMAP command from the host computer 2 (S201). Then, the conflict detection section 103 determines whether or not to execute copy process of the TPPS requested for release (S202).

Here, in a case of being determined to execute the copy process of the TPPS requested for release by the conflict detection section 103 (Yes in S202), the UNMAP command processing section 101 suspends release of the TPPS requested for release (S203). Then, the copy process control section 104 launches the copy process in the background (S204).

In contrast, in a case of being determined not to execute the copy process of the TPPS requested for release by the conflict detection section 103 (No in S202), the UNMAP command processing section 101 releases the TPPS requested for release (S205).

After finishing S204 or S205, the TPPS mapping management section 105 updates the mapping information stored in the mapping information table 23a such that the TPPS requested for release from the host computer 2 becomes in a release state (S206). For example, the TPPS mapping management section 105 deletes a value stored in the "physical LBA" that is associated with the "logical LBA" indicating the TPPS requested for release.

After finishing the process of S206, the UNMAP command processing section 101 sends a response to the UNMAP command to the host computer 2 (S207), and finishes the mapping information update process.

TPPS Acquisition Process Upon Receiving Write I/O

FIG. 7 is a flowchart illustrating a process procedure of TPPS acquisition process when a write I/O has been received in the storage device according to the first embodiment. As illustrated in FIG. 7, the write I/O processing section 102 receives a write I/O from the host computer 2 (S301).

Then, the write I/O processing section 102 requests the TPPS allocation management section 106 to acquire a TPPS for the logical LBA requested for a write I/O. This causes the TPPS allocation management section 106 to acquire a new TPPS for the logical LBA requested by the write I/O processing section 102 (S302).

Subsequently, the write I/O processing section 102 receives write data from the host computer 2 after a new TPPS is acquired by the TPPS allocation management section 106 (S303), and responds to the host computer 2 (S304).

Effects of First Embodiment

In a case that an UNMAP command is issued, the storage device 10 according to the first embodiment does not put the TPPS requested for release in an UNMAP reservation state but updates the mapping information of the logical LBA and the physical LBA to a state of allowing allocation of another new TPPS. After that, the storage device 10 controls an access from the host computer 2 to access a newly allocated TPPS and copy process within the storage device 10 to access the originally allocated TPPS requested for release. Then, the storage device 10 releases the TPPS requested for release at the time when the copy is completed and the information in the TPPS requested for release becomes unused. The storage device 10 pools the TPPS in the pool of a physical disk capacity as an unused region. This enables the UNMAP command process and the copy process to be independent from each other and the storage device 10 to avoid a possibility that a write I/O is timed out.

Second Embodiment

In the first embodiment, a case that the storage device 10 is requested for release of the TPPS storing the data of the logical volume subjected to copy is described. In the storage device 10, there is a case that an UNMAP command and copy of a snapshot type are executed alternately and repeatedly to an identical logical LBA. In this case, the storage device 10 is requested for release of the TPPS storing the data of the logical volume subjected to copy, and also executes new copy to data of a logical volume stored in a TPPS that is newly associated with the logical address specified in the request for release.

With that, a second embodiment represents an example that a storage device stores copy information that associates a saving generation number of copy generation, an identifier of a TPPS storing copy source data, and a logical address indicating a copy destination with each other.

Configuration of Information Processing System 1 According to Second Embodiment

Figure 8:
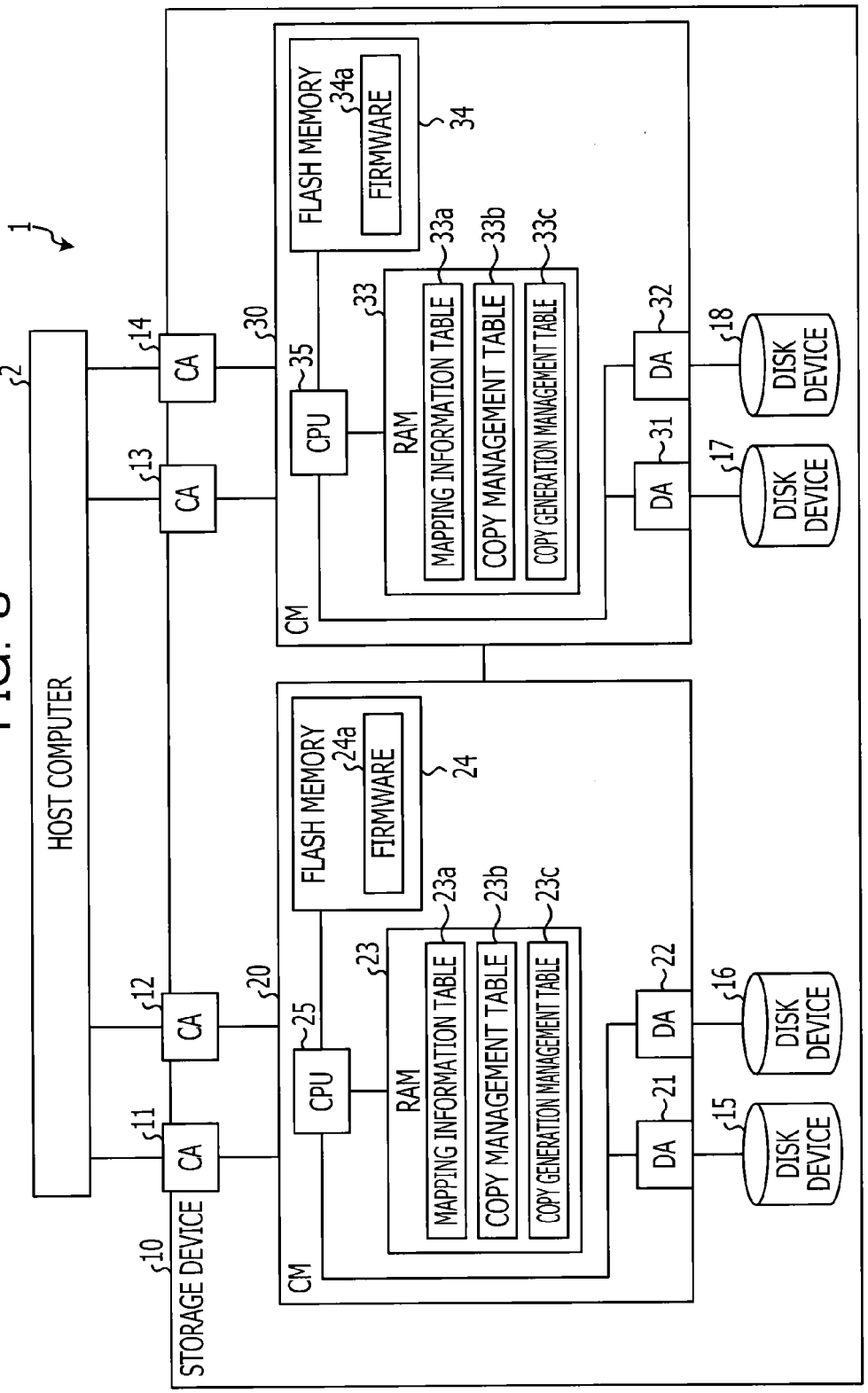
FIG. 8 is a block diagram illustrating a configuration of an information processing system according to a second embodiment.

FIG. 8 is a block diagram illustrating a configuration of an information processing system 1 according to the second embodiment. The information processing system 1 according to the second embodiment includes the host computer 2 and the storage device 10. The configuration of the information processing system 1 according to the second embodiment is similar to the configuration of the information processing system according to the first embodiment illustrated in FIG. 1 other than that a part of the tables and the functional configuration of the firmware maintained in the CMs 20 and 30 are different. Therefore, identical reference numerals are given to functional sections playing roles similar to those of the sections illustrated in FIG. 1 to omit detailed descriptions thereof.

Configuration of CM 20 According to Second Embodiment

With reference to FIG. 8 consecutively, the configuration of the CM 20 according to the second embodiment is described. As illustrated in FIG. 8, the CM 20 includes a DA 21, a DA 22, a RAM 23, a flash memory 24, and a CPU 25.

The RAM 23 stores a mapping information table 23a, a copy management table 23b, and a copy generation management table 23c. The RAM 23 also stores pool management information, not illustrated, for managing a pool of unused TPPSs.

The copy generation management table 23c stores copy information that associates a saving generation number of copy generation, an identifier of a TPPS storing copy source data, and a logical address indicating a copy destination with each other. The data structure of data stored in the copy generation management table 23c is described later with reference to FIG. 9.

The flash memory 24 stores firmware 24a. The functional configuration of functions described in the firmware 24a is described later with reference to FIG. 10. The CPU 25 loads and executes the firmware 24a stored in the flash memory 24, thereby performing various types of arithmetic process. The configuration of the CM 30 is similar to that of the CM 20.

Data Structure of Data Stored in Copy Generation Management Table 23c (33c)

Next, with reference to FIG. 9, the data structure of data stored in the copy generation management table 23c and a copy generation management table 33c are described. Since the data structure of data stored in the copy generation management table 23c is similar to the data structure of data stored in the copy generation management table 33c, the data structure of data stored in the copy generation management table 23c is described here.

FIG. 9 is a chart illustrating one example of a data structure of data stored in the copy generation management table 23c. As illustrated in FIG. 9, the copy generation management table 23c stores information that associates a "copy generation", a "copy source TPPS", a "copy destination OLU", and a "copy destination logical LBA" with each other.

Here, a "copy generation" stored in the copy generation management table 23c represents a saving generation number of copy generation. In other words, the "copy generation" represents how many times an UNMAP command and copy of a snapshot type are executed alternately and repeatedly to an identical logical LBA. For example, the "copy generation" has a value such as "1" and "2".

The "copy source TPPS" stored in the copy generation management table 23c represents an identifier of the TPPS of the copy source. For example, the "copy source TPPS" has a value such as "TPPS_11" and "TPPS_20".

The "copy destination OLU" stored in the copy generation management table 23c represents an identifier of the OLU of the copy destination. For example, the "copy destination OLU" has a value such as "1" and "2". The OLU is a logical unit generally used in open systems.

The "copy destination logical LBA" stored in the copy generation management table 23c represents a logical address in the OLU of the copy destination. For example, the "copy destination logical LBA" has a value such as "5000" and "6000".

In the example illustrated in FIG. 9, the copy generation management table 23c represents that the data of the logical volume stored in the "TPPS_11" is copied to the logical LBA "5000" of the OLU "1" as a first generation. Similarly, the copy generation management table 23c represents that the data of the logical volume stored in the "TPPS_11" is copied to the logical LBA "6000" of the OLU "2" as a second generation.

The copy generation management table 23c represents that the data of the logical volume stored in the "TPPS_20" is copied to the logical LBA "7000" of the OLU "3" as a third generation.

Functional Configuration of Functions Described in Firmware 24a (34a)

Figure 10:
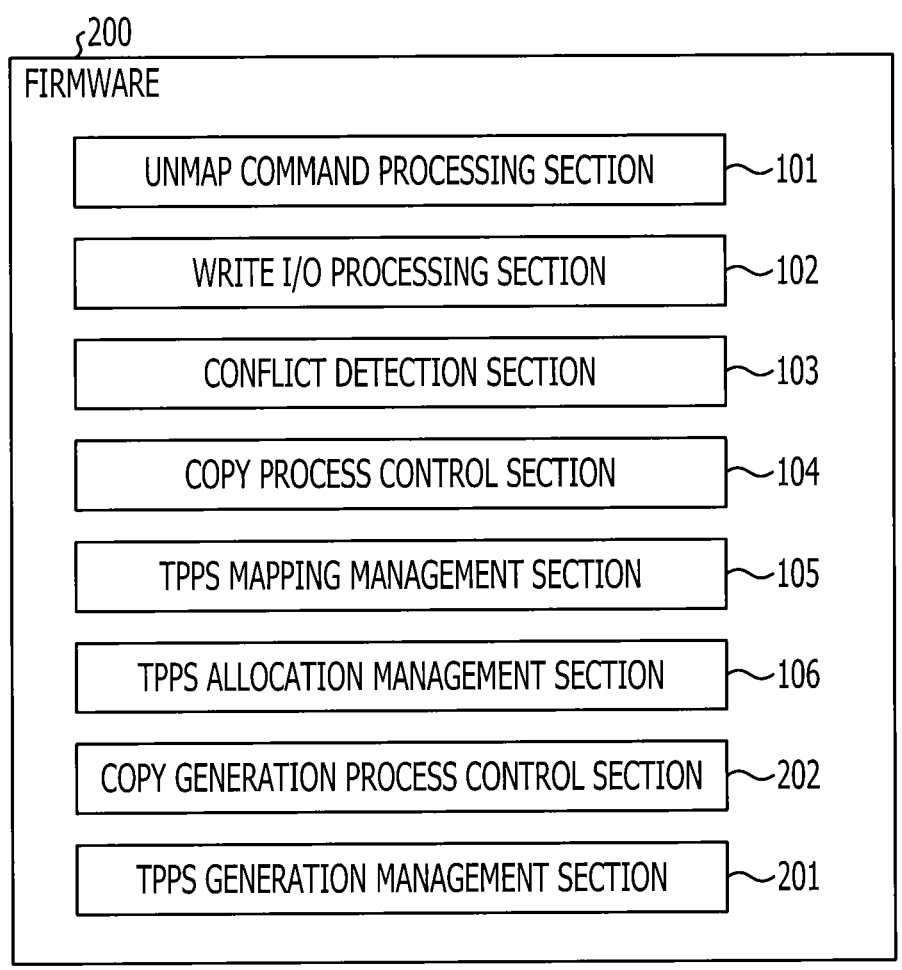
FIG. 10 is a diagram illustrating one example of a functional configuration of a storage device according to the second embodiment.

Next, with reference to FIG. 10, functional configurations of the functions described in the firmware 24a and 34a executed by the storage device 10 according to the second embodiment are described. Since the functional configurations of the functions described in the firmware 24a and 34a executed by the storage device 10 according to the second embodiment are similar, the firmware 24a and 34a are referred as firmware 200 here for the description.

FIG. 10 is a diagram illustrating one example of a functional configuration of functions described in firmware 200 executed by the storage device 10 according to the second embodiment. As illustrated in FIG. 10, the functions described in the firmware 200 include the UNMAP command processing section 101, the write I/O processing section 102, the conflict detection section 103, the copy process control section 104, the TPPS mapping management section 105, and the TPPS allocation management section 106. As illustrated in FIG. 10, the functions described in the firmware 200 include a TPPS generation management section 201 and a copy generation process control section 202. Identical reference numerals are given to sections having functions similar to the functions described in the firmware 100 illustrated in FIG. 4 to omit detailed descriptions.

The TPPS generation management section 201 executes the following process in a case of executing copy process to data stored in a physical address that is freshly associated with the logical address specified in the request for release upon accepting a request for release of the TPPS storing the data subjected to copy. That is, the TPPS generation management section 201 gives a saving generation number to carry out copy process and causes the given saving generation number to be stored in the copy generation management table 23c, thereby managing generations of the TPPS.

The copy generation process control section 202 executes the following process in a case of executing copy process to the data stored in the physical address that is freshly associated with the logical address specified in the request for release upon accepting a request for release of the TPPS storing the data subjected to copy. That is, the copy generation process control section 202 causes the copy information that associates an identifier of a TPPS storing copy source data and a logical address indicating a copy destination in association with a saving generation number of copy generation to be stored in the copy generation management table 23c. For example, the copy generation process control section 202 causes a pair of the TPPS of the copy source and the OLU of the copy destination to be stored in the copy generation management table 23c for each copy generation.

The copy process control section 104 executes copy process for each saving generation number of copy generation with reference to the copy generation management table 23c.

Process Behaviors by Storage Device 10 According to Second Embodiment

Figure 11:
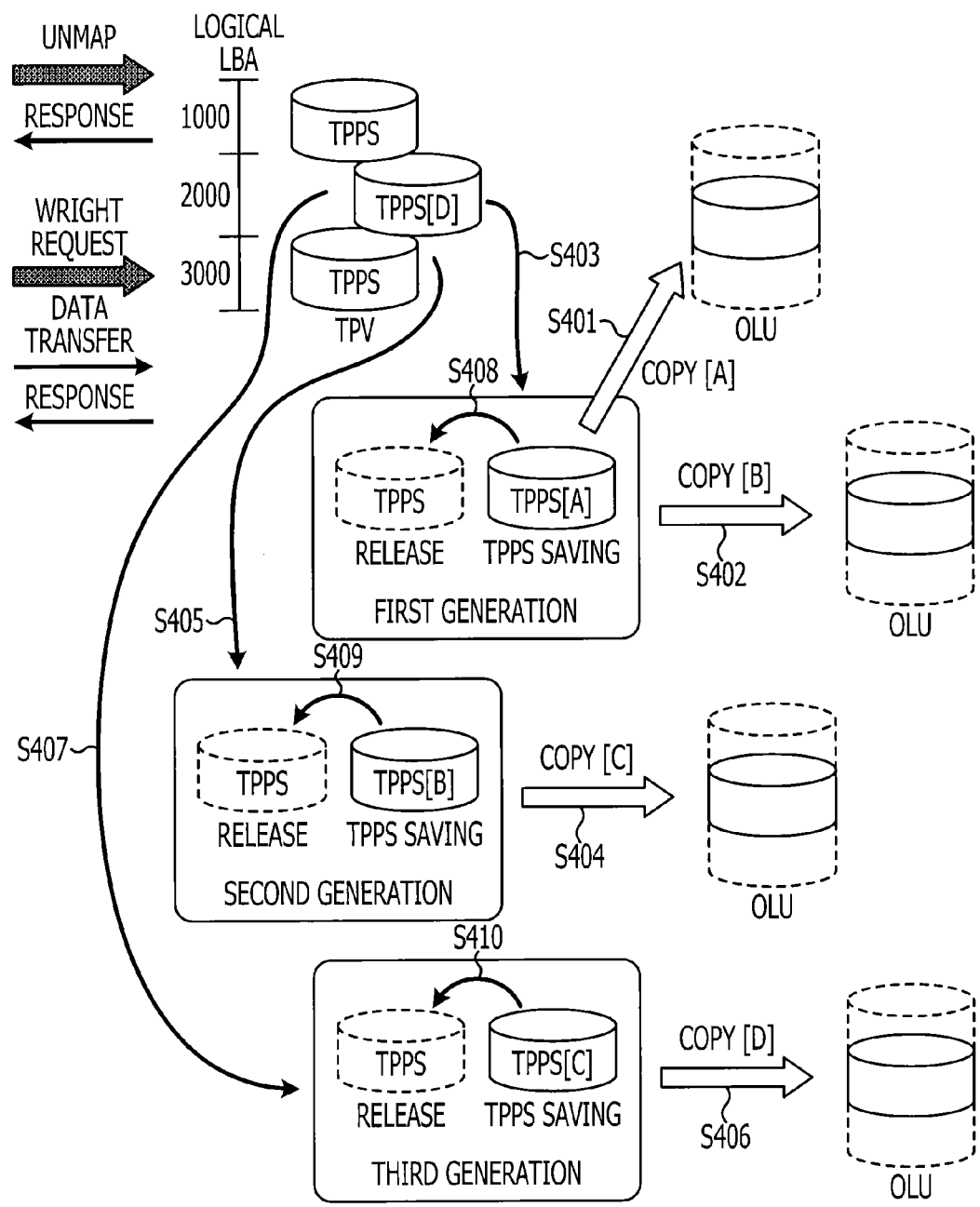
FIG. 11 is a diagram illustrating one example of process behaviors by a storage device according to a second embodiment.

Next, with reference to FIG. 11, one example of process behaviors by the storage device 10 according to the second embodiment is described. FIG. 11 is a diagram illustrating one example of process behaviors by the storage device 10 according to the second embodiment. FIG. 11 illustrates a case that release of the TPPS indicated by the logical LBA "2000" and copy of the data of the logical volume stored in the TPPS indicated by the logical LBA "2000" are executed alternately.

As illustrated in FIG. 11, the storage device 10 executes copy (mentioned as copy[A]) of the data of the logical volume stored in a TPPS (mentioned as TPPS[A]) indicated by the logical LBA "2000" (S401). The storage device 10 also executes copy (mentioned as copy[B]) of the data of the logical volume stored in the TPPS[A] indicated by the logical LBA "2000" (S402).

The storage device 10 receives an UNMAP command, from the host computer 2, that requests for release of the TPPS[A] indicated by the logical LBA "2000". Since the copy of the data of the logical volume stored in the TPPS[A] requested for release is in execution, the storage device 10 manages the TPPS[A] indicated by the logical LBA "2000" as a first generation. The storage device 10 also deletes the TPPS[A] from the mapping information to update the mapping information table 23a (33a) (S403). Accordingly, it is possible to save the TPPS[A] from an access related to the TPV by the host computer 2. Then, the storage device 10 sends a response to the UNMAP command to the host computer 2.

Subsequently, the storage device 10 receives a write request, from the host computer 2, to the TPPS indicated by the logical LBA "2000". The storage device 10 acquires a new TPPS (mentioned as TPPS[B]) for the logical LBA "2000" upon receiving the write request.

Then, the storage device 10 receives write data from the host computer 2 and sends a response to the write request to the host computer 2. The storage device 10 also executes copy (mentioned as copy[C]) of the data of the logical volume stored in the TPPS[B] (S404).

Subsequently, the storage device 10 receives an UNMAP command, from the host computer 2, that requests for release of the TPPS[B] indicated by the logical LBA "2000". Since the copy of the data of the logical volume stored in the TPPS[B] requested for release is in execution, the storage device 10 manages the TPPS[B] indicated by the logical LBA "2000" as a second generation. The storage device 10 also deletes the TPPS[B] from the mapping information to update the mapping information table 23a (33a) (S405). Accordingly, it is possible to save the TPPS[B] from an access related to the TPV by the host computer 2. Then, the storage device 10 sends a response to the UNMAP command to the host computer 2.

Subsequently, the storage device 10 receives a write request, from the host computer 2, to the TPPS indicated by the logical LBA "2000". The storage device 10 acquires a new TPPS (mentioned as TPPS[C]) for the logical LBA "2000" upon receiving the write request.

Then, the storage device 10 receives write data from the host computer 2 and sends a response to the write request to the host computer 2. The storage device 10 also executes copy (mentioned as copy[D]) of the data of the logical volume stored in the TPPS[C] (S406).

Subsequently, the storage device 10 receives an UNMAP command, from the host computer 2, that requests for release of the TPPS[C] indicated by the logical LBA "2000". Since the copy of the data of the logical volume stored in the TPPS[C] requested for release is in execution, the storage device 10 manages the TPPS[C] indicated by the logical LBA "2000" as a third generation. The storage device 10 also deletes the TPPS[C] from the mapping information to update the mapping information table 23a (33a) (S407). Accordingly, it is possible to save the TPPS[C] from an access related to the TPV by the host computer 2. The storage device 10 acquires a new TPPS (mentioned as TPPS[D]) for the logical LBA "2000" in a case of receiving a write request, from the host computer 2, to the TPPS indicated by the logical LBA "2000".

The storage device 10 releases the TPPS[A] in the first generation after finishing the copy[A] and the copy[B] of the TPPS[A] (S408). The storage device 10 also releases the TPPS[B] in the second generation after finishing the copy[C] of the TPPS[B] (S409). Similarly, the storage device 10 releases the TPPS[C] in the third generation after finishing the copy[D] of the TPPS[C] (S410).

Figure 12:
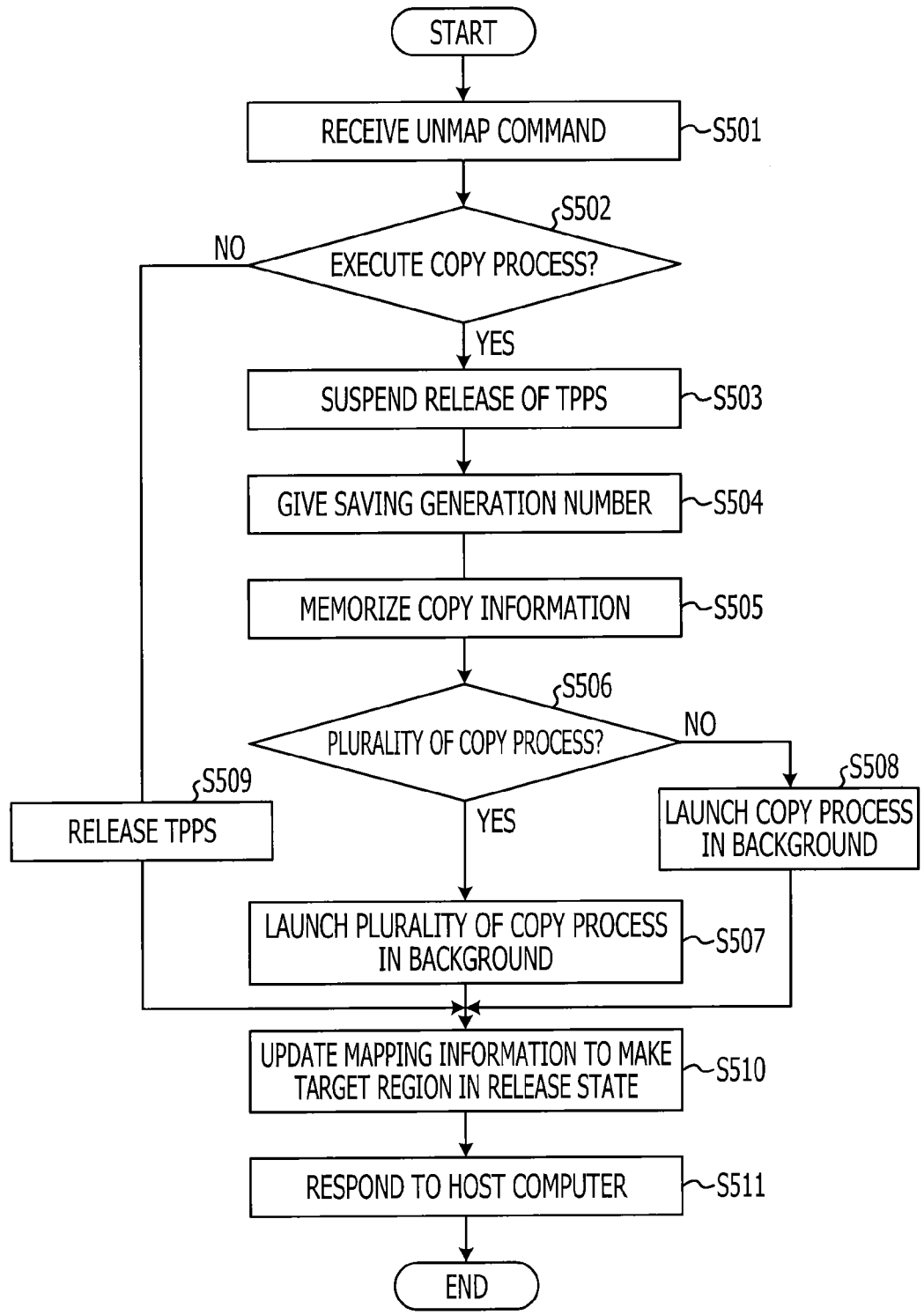
FIG. 12 is a flowchart illustrating a process procedure of mapping information update process by a storage device according to a second embodiment.

Process Procedure of Process by Storage Device 10 According to Second Embodiment Next, with reference to FIG. 12, a process procedure of the mapping information update process by the storage device 10 according to the second embodiment is described. FIG. 12 is a flowchart illustrating a process procedure of mapping information update process by the storage device 10 according to the second embodiment.

As illustrated in FIG. 12, the UNMAP command processing section 101 receives an UNMAP command (S501). Then, the conflict detection section 103 determines whether or not to execute the copy process of the TPPS requested for release (S502).

Here, in a case of being determined to execute the copy process of the TPPS requested for release by the conflict detection section 103 (Yes in S502), the UNMAP command processing section 101 does not immediately release the TPPS requested for release (S503).

Then, the TPPS generation management section 201 gives a saving generation number to carry out the copy process to be stored in the copy generation management table 23c (S504). The copy generation process control section 202 causes the copy information that associates an identifier of a TPPS storing copy source data with a logical address indicating a copy destination to be stored in the copy generation management table 23c (S505).

Subsequently, the copy process control section 104 determines whether or not there are a plurality of items of copy process (S506). Here, in a case of determining that there are a plurality of items of copy process (Yes in S506), the copy process control section 104 launches the plurality of items of copy process in the background (S507). In contrast, in a case of determining that there is only one item of copy process (No in S506), the copy process control section 104 launches the copy process in the background (S508).

In contrast, in a case of being determined not to execute copy process of the TPPS requested for release by the conflict detection section 103 (No in S502), the UNMAP command processing section 101 releases the TPPS requested for release (S509).

After finishing S507, S508, or S509, the TPPS mapping management section 105 updates the mapping information stored in the mapping information table 23a such that the TPPS requested for release from the host computer 2 becomes in a release state (S510).

Subsequently, the UNMAP command processing section 101 sends a response to the UNMAP command to the host computer 2 (S511) and finishes the mapping information update process.

Effects of Second Embodiment

As described above, the storage device 10 according to the second embodiment is capable of managing a pair of a "copy source" and a "copy destination" for each generation.

Third Embodiment

In the first and second embodiments, the copy is executed by taking an OLU as a copy destination in a case that the storage device 10 copies the data of the logical volume stored in the TPPS requested for release. The storage device 10 may also take a TPV, not an OLU, as a copy destination.

In such a case, the storage device 10 may also updates the mapping information table 23a or 33a for the copy destination without executing copy process.

With that, in a third embodiment, a case that the copy process control section 104 has the following functions is described. The copy process control section 104 according to the third embodiment executes the following process in a case that the copy destination of the data of the logical volume stored in the saved TPPS is a TPV. That is, the copy process control section 104 associates the logical LBA of the TPV in the copy destination with the physical LBA indicating the TPPS to be stored in the mapping information table 23a.

Process Procedure of Process by Storage Device 10 According to Third Embodiment

Figure 13:
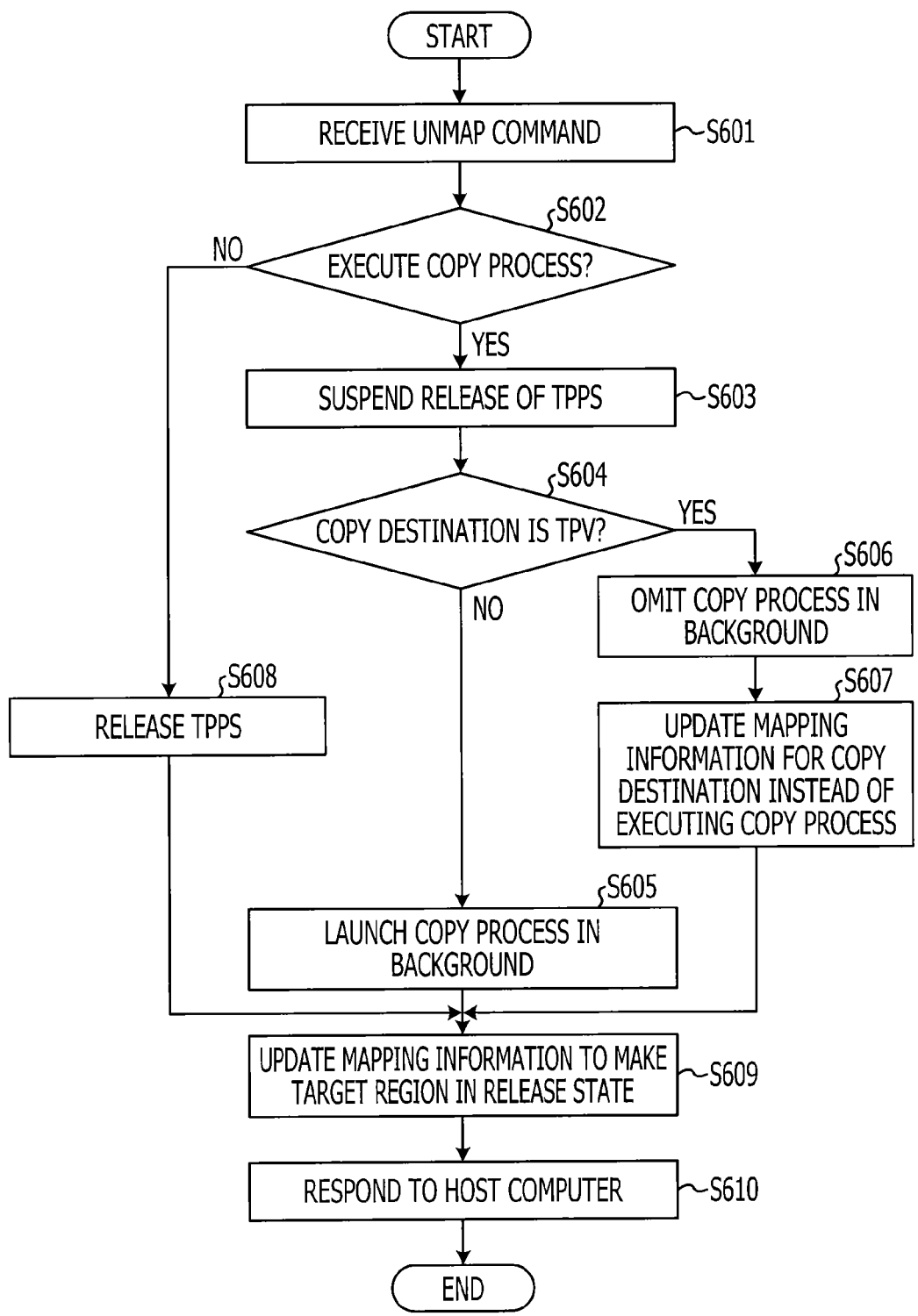
FIG. 13 is a flowchart illustrating a process procedure at the time of copy to a TPV by a storage device according to a third embodiment.

With reference to FIG. 13, the process procedure of the process by the storage device 10 according to the third embodiment is described. FIG. 13 is a flowchart illustrating a process procedure at the time of copy to a TPV by the storage device 10 according to the third embodiment. FIG. 13 illustrates a case of copying the TPPS_22 indicated by the logical LBA "2000" to the logical LBA "9000" of the TPV.

As illustrated in FIG. 13, the UNMAP command processing section 101 receives an UNMAP command (S601). Then, the conflict detection section 103 determines whether or not to execute the copy process of the TPPS requested for release (S602).

Here, in a case of being determined to execute the copy process of the TPPS requested for release by the conflict detection section 103 (Yes in S602), the UNMAP command processing section 101 suspends release of the TPPS requested for release (S603). Then, the copy process control section 104 determines whether or not the copy destination is a TPV (S604).

In a case of determining that the copy destination is not a TPV (No in S604), the copy process control section 104 launches the copy process in the background (S605). In contrast, in a case of determining that the copy destination is a TPV (Yes in S604), the copy process control section 104 determines to omit the copy process in the background (S606). Then, the copy process control section 104 updates the mapping information for the copy destination instead of executing the copy process (S607). For example, the copy process control section 104 causes information that associates the logical LBA "9000" with the TPPS_22 to be stored in the mapping information table 23a as the mapping information for the copy destination.

In contrast, in a case of being determined not to execute the copy process of the TPPS requested for release by the conflict detection section 103 (No in S602), the UNMAP command processing section 101 releases the TPPS requested for release (S608).

After finishing S605, S607, or S608, the TPPS mapping management section 105 updates the mapping information such that the TPPS requested for release from the host computer 2 becomes in a release state (S609). For example, the TPPS mapping management section 105 deletes a value stored in the "physical LBA" that is associated with the logical LBA "2000".

Then, the UNMAP command processing section 101 sends a response to the UNMAP command to the host computer 2 (S610) and finishes the process.

Effects of Third Embodiment

In such a manner, in a case that the copy destination of the TPPS requested for release is a TPV, the storage device may omit the copy process. The process of omitting the copy process may be combined with the process of managing the copy generation.

Figure 14:
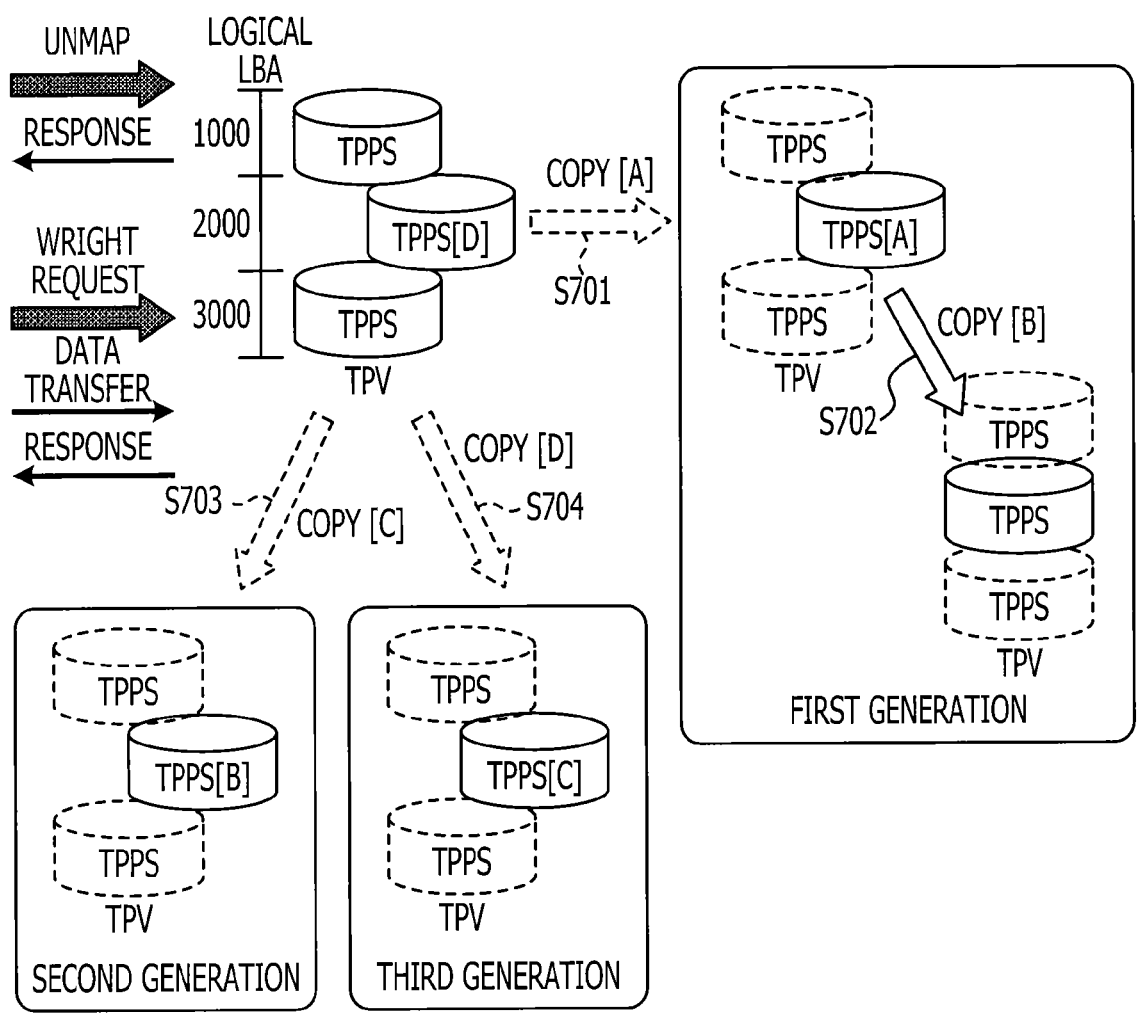
FIG. 14 is a diagram illustrating one example of process behaviors by a storage device according to a third embodiment.

Next, with reference to FIG. 14, one example of process behaviors to combine the process of omitting copy process with the process of managing the copy generation by the storage device 10 according to the third embodiment is described. FIG. 14 is a diagram illustrating one example of process behaviors by the storage device 10 according to the third embodiment. FIG. 14 illustrates a case that release of the TPPS indicated by the logical LBA "2000" and copy of the data of the logical volume stored in the TPPS indicated by the logical LBA "2000" are executed alternately and that the copy destination is a TPV.

As illustrated in FIG. 14, the storage device 10 receives an UNMAP command, from the host computer 2, that requests for release of the TPPS[A] indicated by the logical LBA "2000". Here, in a case of executing copy (mentioned as copy[A]) of the data of the logical volume stored in a TPPS (mentioned as TPPS[A]) requested for release, the storage device 10 manages the TPPS[A] indicated by the logical LBA "2000" as a first generation. The storage device 10 also deletes the TPPS[A] from the mapping information to update the mapping information table 23a (33a). Accordingly, it is possible to save the TPPS[A] from the access related to the TPV by the host computer 2. Since the copy destination is a TPV, the storage device 10 determines to omit copy process and updates the mapping information for the copy destination instead of executing the copy process (S701).

After finishing the copy[A], the storage device 10 executes copy (mentioned as copy[B]) of the data of the logical volume stored in the TPPS[A] (S702). In this case, since the copy source is the already saved TPPS[A], the storage device 10 physically copies the data of the logical volume stored in the TPPS[A].

Subsequently, the storage device 10 receives a write request, from the host computer 2, to the TPPS indicated by the logical LBA "2000". The storage device 10 acquires a new TPPS (mentioned as TPPS[B]) for the logical LBA "2000".

Then, the storage device 10 receives an UNMAP command, from the host computer 2, that requests for release of the TPPS[B] indicated by the logical LBA "2000". Here, in a case of executing copy (mentioned as copy[C]) of the data of the logical volume stored in the TPPS[B] requested for release, the storage device 10 manages the TPPS[B] indicated by the logical LBA "2000" as a second generation. The storage device 10 also deletes the TPPS[B] from the mapping information to update the mapping information table 23a (33a). Accordingly, it is possible to save the TPPS[B] from the access related to the TPV by the host computer 2. Since the copy destination is a TPV, the storage device 10 determines to omit copy process and updates the mapping information for the copy destination instead of executing the copy process (S703).

Subsequently, the storage device 10 receives a write request, from the host computer 2, to the TPPS indicated by the logical LBA "2000". The storage device 10 acquires a new TPPS (mentioned as TPPS[C]) for the logical LBA "2000".

Then, the storage device 10 receives an UNMAP command, from the host computer 2, that requests for release of the TPPS[C] indicated by the logical LBA "2000". Here, in a case of executing copy (mentioned as copy[D]) of the data of the logical volume stored in the TPPS[C] requested for release, the storage device 10 manages the TPPS[C] indicated by the logical LBA "2000" as a third generation. The storage device 10 also deletes the TPPS[C] from the mapping information to update the mapping information table 23a (33a). Accordingly, it is possible to save the TPPS[C] from the access related to the TPV by the host computer 2. Since the copy destination is a TPV, the storage device 10 determines to omit copy process and updates the mapping information for the copy destination instead of executing the copy process (S704).

Subsequently, the storage device 10 receives a write request, from the host computer 2, to the TPPS indicated by the logical LBA "2000". The storage device 10 acquires a new TPPS (mentioned as TPPS[D]) for the logical LBA "2000".

After finishing the copy[A] and the copy[B] of the TPPS[A] in the first generation, the storage device 10 releases the TPPS[A]. After finishing the copy[C] of the TPPS[B] in the second generation, the storage device 10 releases the TPPS[B]. Similarly, after finishing the copy[D] of the TPPS[C] in the third generation, the storage device 10 releases the TPPS[C].

System Configuration

The embodiments may be implemented in a variety of different modes other than the embodiments described above. Among each items of process described in the embodiments, all or part of the process described to be executed automatically may also be executed manually. Alternatively, all or part of the process described to be executed manually may also be executed automatically in an existing method. Other than them, the process procedure, the control procedure, and the specific names represented in the above description and the drawings may be optionally modified unless otherwise specified.

In accordance with various types of load, status of use, and the like, the order of process may also be modified in the process described in each embodiment.

Each of the illustrated components is functionally conceptual and is not desired to be physically configured as illustrated. For example, among the functions of the firmware 200 executed by the storage device 10, the TPPS generation management section 201 and the copy generation process control section 202 may be integrated. Further, each process function executed in each device may be achieved by a CPU and a program analyzed and executed by the CPU or achieved as hardware by a wired logic in its all or an optional part.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device comprising:
a memory; and
a control device to
  allocate a first storage region out of a plurality of storage regions to a first logical address specified by an external device,
  store, in the memory, first information associating the first logical address with a first physical address indicating the first storage region,
  delete, upon accepting a request for release of a second storage region indicated by a second physical address associated with a second logical address specified by the external device, second information associating the second logical address with the second physical address from the memory, acquire, upon receiving a request for writing data with the second logical address, a third storage region out of the plurality of storage regions for the second logical address, store, in the memory, third information associating the second logical address with a third physical address indicating the third storage region, and release, after the third storage region has been acquired and when a copy process of copying first data stored in the second storage region has not been executed, the second storage region after finishing the copy process.

2. The storage device according to claim 1, wherein the control device stores, when the first data is subjected to copy and when executing the copy process to second data stored in the third storage region indicated by the third physical address newly associated with the second logical address, copy information associating a generation number of copy generation, an identifier of the third storage region, and a third logical address indicating a copy destination in the memory, and executes a copy process for each generation number with reference to the copy information.

3. The storage device according to claim 1, wherein the control device stores, when a copy destination of the copy process is a virtual region, the third information associating the third logical address of the copy destination with the second physical address in the memory.

4. A method for controlling a storage device including a memory and a control device, the method comprising:

allocating, by the control device, a first storage region out of a plurality of storage regions to a first logical address specified by an external device;

storing, in the memory, first information associating the first logical address with a first physical address indicating the first storage region;

deleting, upon accepting a request for release of a second storage region indicated by a second physical address associated with a second logical address specified by the external device, second information associating the second logical address with the second physical address from the memory;

acquiring, upon receiving a request for writing data with the second logical address, a third storage region out of the plurality of storage regions for the second logical address;

storing, in the memory, third information associating the second logical address with a third physical address indicating the third storage region; and releasing, after the third storage region has been acquired and when a copy process of copying first data stored in the second storage region has not been executed, the second storage region after finishing the copy process.

* * * * *